Oct. 3, 1950        E. M. McDONALD        2,524,460
TREE STAND
Filed Aug. 30, 1946        2 Sheets-Sheet 1
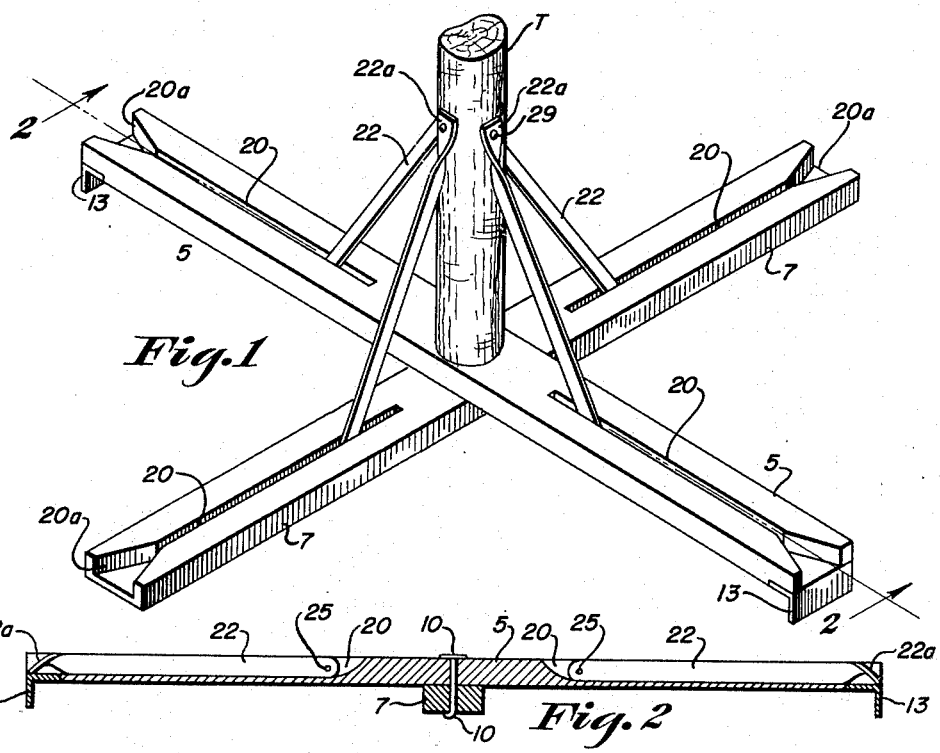
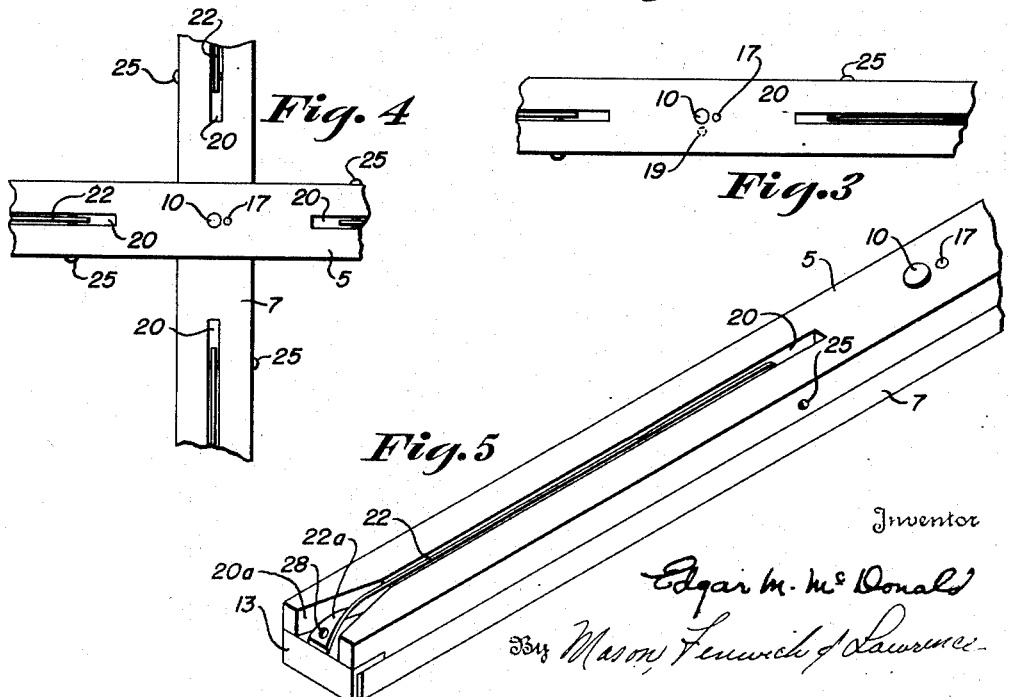
Inventor
Edgar M. McDonald
By Mason, Fenwick & Lawrence
Attorneys Oct. 3, 1950  E. M. McDONALD  2,524,460
TREE STAND
Filed Aug. 30, 1946  2 Sheets-Sheet 2
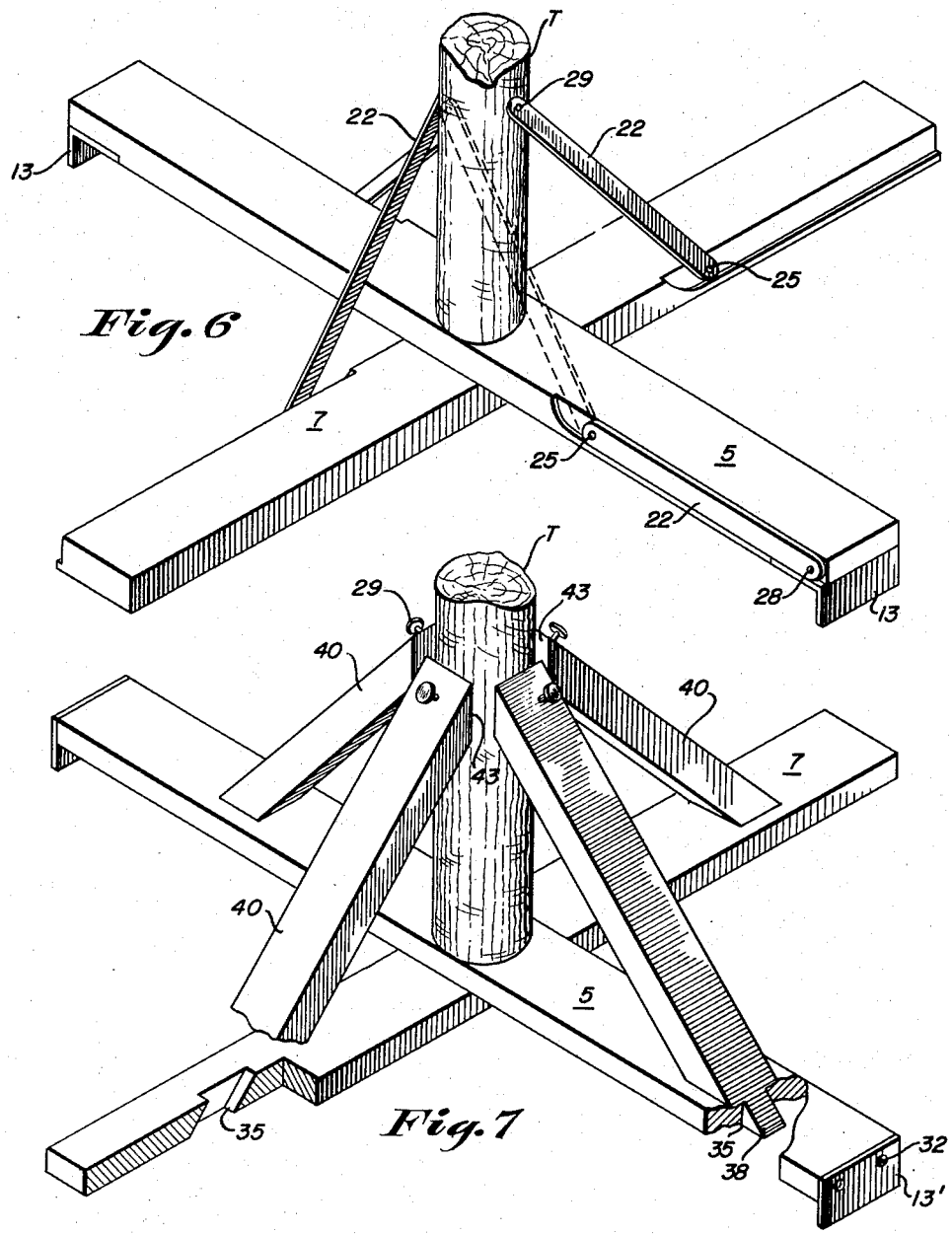

Patented Oct. 3, 1950

2,524,460

UNITED STATES PATENT OFFICE 2,524,460

TREE STAND

Edgar M. McDonald, Greenville, S. C.

Application August 30, 1946, Serial No. 693,906

2 Claims. (Cl. 248—44)

This invention relates to foldable supporting devices and more particularly to devices for maintaining Christmas trees or poles and the like in vertical position.

It is an object of my invention to provide a device of the class described which may be easily set up and secured to the base of a tree with a minimum of effort.

It is a further object of my invention to provide a device which will hold the tree in substantially rigid, vertical alignment and which may be applied with no tools other than a hammer, and by an unskilled person.

It is another object of my invention to provide a tree holding device which may be easily folded and stored in a minimum of space when not in use.

My invention will now be described in detail in conjunction with the accompanying drawings, in which:

Figure 1 is a perspective view showing a preferred form of my device in set-up condition, and the manner in which it is adapted to support a tree.

Figure 2 is a section through the line 2—2 of Figure 1;

Figure 3 is a partial plan of the form shown in Figure 1 when it is folded for storage;

Figure 4 is a partial plan of the form shown in Figure 1 when it is in tree supporting position;

Figure 5 is a perspective of the form shown in Figure 1 in folded condition;

Figure 6 is a perspective of a modified form of my invention; and

Figure 7 is a perspective of a still further modified form of my invention.

With reference to Figures 1 to 5, my device comprises a pair of floor members 5 and 7, preferably of wood, and pivoted in any suitable manner as by a nail 10 at their mid-points so that they may be disposed in parallel or folded relationship, as shown in Figure 5, or in unfolded or tree-supporting relationship as shown in Figure 1. The upper floor member 5 is somewhat longer at its extremities than the member 7 so as to provide support portions for metallic feet 13. Feet 13 are channel shaped members secured at the extremities of member 5, and have the same vertical dimension as that of floor member 7 so as to act as a levelling means when the members 5 and 7 are disposed at right angles to each other for supporting a tree, as best shown in Figure 2. Each of the floor members is provided with a nail-receiving hole 17 in member 5, and 19 in member 7, as best shown by comparison of Figures 3 and 4. The holes 17 and 19 are disposed in their respective floor members so that when such members are rotated in tree-supporting position (Figure 4), the holes are axially aligned with each other, whereby a nail (not shown) may be received therethrough, coming up from the bottom of the structure and protruding into the base of the tree T parallel to and spaced slightly from the axis thereof. For all practical purposes a nail slightly offset as described is as effective for maintaining vertical alignment of the tree as would be a nail at the axis thereof. The portions of the floor members which are on opposite sides of the pivotal point provided by the nail 10 are provided with grooves 20 for the purpose of receiving metallic tree braces 22 which are pivotally related to respective portions of the floor members in any suitable manner as by nails 25 embedded in a wall of the groove as best seen by comparison of Figures 2 and 4. Owing to the superimposed relationship of member 5 on member 7, the length of braces 22 may be designed, if desired, so that such braces when swung in vertical planes to engage the tree T, as shown in Figure 1, will contact the tree butt at points equally spaced from the floor, although such expedient is not strictly necessary. The braces 22 have their outer portions 22a twisted so as to be perpendicular to the planes of respective rotation and which portions 22a are provided with holes 28 for receiving nails 29 passing therethrough and embedded in the butt of the tree. The grooves 20 are widened at their outer ends, as at 20a, to accommodate the portions 22a. Accordingly, it will be seen that the device shown in Figures 1 through 5 may readily be erected from the folded position shown in Figure 5 to the position shown in Figure 1 and secured to a tree by a nail passing upwardly through the aligned holes 17 and 19 and by nails 29 passing through the holes 28 into the tree butt. Further, it will be seen that when the device is in folded position the braces 22 are fully recessed within their respective floor members whilst the feet 13 are aligned with the floor member 7 and may be suitably spaced from the ends thereof so as to require the exertion of a slight force to swing the floor members askew to each other when setting up, thereby providing a locking effect to insure a small and compact folded structure.

In the form shown in Figure 6 wherein the same reference characters are used for corresponding parts as found in Figures 1 through 5, the braces 22 are secured at the vertical sides of the floor members 5 and 7 in grooves provided therein and are swung upwardly from the recessed position, as indicated by the arrow, from the full line to the dotted position so as to engage the butt of the tree tangentially, being secured thereto by nails 29. This form of the invention although not regarded as providing as rigid a support for the tree as the form shown in Figures 1 through 5 due to the cantilever stress on the nails, is nevertheless more economical of manufacture, while at the same time preserving the essential structure for achieving the objects of my invention.

In the form shown in Figure 7, the floor members 5 and 7 are provided with feet 13', differing somewhat from the feet 13 of the previous modification, in that they are secured to the butt ends of member 5 in any suitable manner, as by nails 32. The members 5 and 7 are in this case provided with rabbeted notches 35, shown fragmentarily in Figure 7, and disposed to accommodate tenon-like members 38 of tree braces 40 which may, in this instance, be comprised of wood. Braces 40 are provided with mitered upper ends 43 for engaging the tree T, being secured thereto by nails 29, as in the other modifications. In this form of the invention, the braces 40 are entirely separable from the members 5 and 7, but when erected to support a tree, constitute a rigid holding device therefor. It will be understood that members 5 and 7, in Figure 7, are provided with alignable holes 17 and 19 (not shown), as heretofore described in connection with Figures 1 through 5.

I believe that my invention is subject to considerable variation without departing from the spirit thereof, and I do not intend to be bound by the specific disclosures hereinabove described except as set forth in the appended claims.

What I claim is:

1. In a Christmas tree support, a pair of floor members pivotally secured to each other so as to be disposed in parallel or angular relationship, a longitudinally extending groove in each portion of each member on opposite sides of said pivotal point and spaced therefrom, a tree brace of substantially the same length as the groove nested in each groove and pivoted therein by its end nearest the pivotal point, whereby said braces are entirely masked by the floor members when disposed in said slots, each of said braces having a nail receiving hole through its free end through which a nail can be passed to secure it to a tree.

2. In a Christmas tree support, a pair of floor members pivotally secured to each other so as to be disposed in parallel or angular relationship, a groove in each portion of said members on opposite sides of said pivotal point, each of said portions having a tree brace pivoted thereto and adapted to be fully received in respective grooves when said members are in parallel relation, said grooves radiating from the pivot point of said floor members and respective braces being secured by pivot pins to walls of respective grooves, and wherein said braces comprise flat elongated metallic members rotatable edgewise in substantially vertical planes with respect to said floor members when said floor members are in tree-supporting position, each brace having a portion of its outer end twisted substantially perpendicular to the plane of rotation, and a nail-receiving hole through each of said latter portions, whereby said latter portions may be brought into radially bracing contact with a tree and secured by nails passing through said nail-receiving holes, said grooves being widened at the outer extremities to accommodate respective latter portions of said braces.

EDGAR M. McDONALD.

REFERENCES CITED

The following references are of record in the file of this patent:

UNITED STATES PATENTS

| Number | Name | Date |
|---|---|---|
| 573,225 | Kurtz | Dec. 15, 1896 |
| 923,206 | Singleton | June 1, 1909 |
| 926,638 | Barton | June 29, 1909 |
| 952,655 | Wagner | Mar. 22, 1910 |
| 1,653,225 | O'Loughlin | Dec. 20, 1927 |
| 1,662,579 | Kirshner | Mar. 13, 1928 |
| 1,914,440 | Larson | June 20, 1933 |